United States Patent
Di Bella

[15] 3,692,850
[45] Sept. 19, 1972

[54] PROCESS FOR THE PRODUCTION OF 2,4,5-TRICHLOROTOLUENE

[72] Inventor: Eugene P. Di Bella, Rochelle Park, N.J.

[73] Assignee: Tenneco Chemicals, Inc.

[22] Filed: July 31, 1970

[21] Appl. No.: 60,083

[52] U.S. Cl. ............................................. 260/650 R
[51] Int. Cl. ......................... C07c 25/00, C07c 25/04
[58] Field of Search ................................ 260/650 R

[56] References Cited

UNITED STATES PATENTS

| | | | |
|---|---|---|---|
| 3,226,447 | 12/1965 | Bing et al. | 260/650 R |
| 2,976,330 | 3/1961 | Guerin | 260/650 R |
| 1,946,040 | 2/1934 | Stoesser et al. | 260/650 R X |

FOREIGN PATENTS OR APPLICATIONS

| | | | |
|---|---|---|---|
| 988,306 | 4/1965 | Great Britain | 260/650 R |
| 1,116,353 | 1/1968 | Great Britain | 260/650 R |
| 223,024 | 7/1959 | Australia | 260/650 R |
| 3,813,371 | 7/1963 | Japan | 260/650 R |
| 393,821 | 4/1964 | Japan | 260/650 R |

OTHER PUBLICATIONS

Silberrad, J. Chem. Soc., 127, (1925), pp. 2677–2684.

Primary Examiner—Howard T. Mars
Attorney—Daniel J. Reardon, Barry G. Magidoff and Evelyn Berlow

[57] ABSTRACT

Trichlorotoluene that contains at least 75 percent of 2,4,5-trichlorotoluene is prepared by contacting para-chlorotoluene with chlorine in the presence of a chlorination catalyst that is either a metal sulfide or a mixture of a ring-chlorination catalyst and, as co-catalyst, a sulfur compound to form a reaction mixture containing an average of about 3 gram atoms of chlorine per mole and then separating the trichlorotoluene fraction from the reaction mixture.

2 Claims, No Drawings

PROCESS FOR THE PRODUCTION OF 2,4,5-TRICHLOROTOLUENE

This invention relates to a process for the production of trichlorotoluenes. More particularly, it relates to a process for the chlorination of parachlorotoluene whereby there is formed a mixture of trichlorotoluene isomers of unusually high 2,4,5-trichlorotoluene content.

2,4,5-Trichlorotoluene is used commercially as an intermediate in the production of compounds that are useful as pesticides, lubricants, dyestuffs, and pharmaceuticals. For example, it is used in the preparation of 2,4,5-trichlorobenzotrifluoride, which is used as an ingredient of hydraulic fluids and lubricating compositions.

In the past 2,4,5-trichlorotoluene has been produced by chlorinating toluene or para-chlorotoluene in the presence of iron, iodine, or another known ring-chlorination catalyst to obtain a trichlorotoluene product that contains only a relatively small proportion of the 2,4,5-isomer and separating this compound from the other, less desirable trichlorotoluene isomers.

In accordance with this invention, it has been found that when para-chlorotoluene is chlorinated in the presence of any of the known ring-chlorination catalysts and a co-catalyst that is a sulfur compound the trichlorotoluene mixture formed has a 2,4,5-trichlorotoluene content that is substantially higher than that obtained when the chlorination is carried out in the absence of the co-catalyst.

The process of this invention is carried out by contacting para-chlorotoluene, 2,4-dichlorotoluene, or 3,4-dichlorotoluene with chlorine in the presence of a ring-chlorination catalyst and a co-catalyst as hereinafter defined until the reaction product is a mixture of chlorotoluenes that contains an average of about 3 gram atoms of chlorine per mole. This mixture may be fractionally distilled to separate the trichlorotoluenes from the dichlorotoluenes and tetrachlorotoluenes that are present. The trichlorotoluene fraction, which contains at least 75 percent of 2,4,5-trichlorotoluene, may be subjected to fractional distillation or crystallization to yield substantially pure 2,4,5-trichlorotoluene.

The chlorination of para-chlorotoluene is carried out in the presence of a ring-chlorination catalyst and a co-catalyst that is a sulfur compound. Any of the well-known ring-chlorination catalysts that are used in the production of chlorobenzenes and chlorotoluenes may be used. These include, for example, iron, iron chloride, antimony pentachloride, aluminum chloride, zinc chloride, zirconium tetrachloride, tin chloride, molybdenum chloride, iodine, and boron trifluoride. The preferred ring-chlorination catalysts and the ones ordinarily used in the practice of this invention are iron, iron chloride, and zirconium tetrachloride.

The sulfur compounds that may be used as co-catalysts in the process of this invention include sulfur and a wide variety of organic and inorganic compounds that contain one or more divalent sulfur atoms and that are soluble to at least a limited extent in the reaction mixture. These include sulfur, sulfur chlorides, carbon disulfide, thionyl chloride, thiophenes, thiophanes, alkyl-, cycloalkyl-, aryl-, and aralkyl mercaptans and dimercaptans, thioethers, and the like. The sulfur compounds that are preferably used as co-catalysts are sulfur, sulfur monochloride, sulfur dichloride, thiophene, and ethylene trithiocarbonate.

In a preferred embodiment of this invention, the combination of ring-chlorination catalyst and co-catalyst is replaced by a metallic sulfide. These compounds which contain at least one divalent sulfur atom are sulfides of the aforementioned metals whose chlorides are useful as ring-chlorination catalysts. Particularly advantageous results have been obtained using ferrous sulfide, zirconium disulfide, and zinc sulfide. The metal sulfides may be added to the reaction mixture as such, or they may be formed in situ by reaction of the metal chloride that is being used as the ring-chlorination catalyst and the sulfur compound that is the co-catalyst.

The amounts of the ring-chlorination catalyst and co-catalyst that are used are not critical and are those that will produce a trichlorotoluene fraction that contains at least 75 percent of the 2,4,5-isomer. In most cases about 0.25 gram to 5 grams of the ring-chlorination catalyst and 0.25 gram to 5 grams of the co-catalyst are used per mole of para-chlorotoluene. Excellent results have been obtained using either 2 grams to 4 grams of the ring-chlorination catalyst and 1 gram to 2 grams of the co-catalyst or 1 gram to 3 grams of metallic sulfide per mole of para-chlorotoluene. The relative amounts of the catalyst and co-catalyst that are used are not critical. Significant increases in the 2,4,5,-isomer content of the trichlorotoluene fraction have been noted when about 0.1 part to 5 parts by weight of the co-catalyst was used per part by weight of the catalyst. In most cases about 0.25 part to 0.50 part by weight of the co-catalyst is used per part by weight of the ring-chlorination catalyst.

The chlorination of para-chlorotoluene, 2,4-dichlorotoluene, or 3,4-dichlorotoluene to form trichlorotoluene that contains at least 75 percent of the 2,4,5-isomer is carried out by procedures that are well known in the art. For example, chlorine may be added to a reaction mixture containing the chlorotoluene, catalyst, and co-catalyst until the increase in the weight of the reaction mixture or in its specific gravity indicates that the desired amount of chlorine has reacted with the chlorotoluene starting material. When the chlorination is continued until the reaction product contains an average of about 3 gram atoms of chlorine per mole, the reaction product generally contains about 75 to 90 percent of trichlorotoluene, 3 to 10 percent of dichlorotoluene, and 5 to 20 percent of tetrachlorotoluene. The trichlorotoluene fraction, which may be separated from the dichlorotoluenes and tetrachlorotoluenes by fractional distillation or other known techniques, contains at least 75 percent of 2,4,5-trichlorotoluene, the remainder being principally 2,3,4-trichlorotoluene. 2,4,5-Trichlorotoluene may be separated from its isomers by fractional distillation or fractional crystallization.

The chlorination reaction may be carried out at temperatures in the range of about −5° to 100°C. with 25° to 50°C. the preferred range. Below about −5°C., the reaction takes place too slowly to be of commercial interest. At temperatures in the range of about 80° to 100°C., there is a tendency for side-chain chlorinated by-products to form. Since chlorination is an exothermic reaction, external cooling may be required to maintain the reaction temperature in the desired range.

The rate at which chlorine is added to the reaction mixture does not have an appreciable effect on the yield of trichlorotoluene or on the isomer distribution in the product.

The invention is further illustrated by the examples that follow.

EXAMPLE 1

Mixtures of 253 grams (2.0 moles) of commercial parachlorotoluene which contained 98.4 percent of para-chlorotoluene, 0.7 percent of meta-chlorotoluene, and 0.9 percent of orthochlorotoluene and a chlorination catalyst in a glass chlorination vessel were chlorinated by passing a stream of gaseous chlorine over the surface of the reaction mixtures at the rate of about 70 grams per hour until a weight increase of about 138 grams (ca. 2 gram atoms of chlorine per mole of para-chlorotoluene) was attained. During the chlorination the reaction mixtures were stirred, and external cooling was used during most of the chlorination to maintain the reaction temperature in the range of 25°–30C. During the final stages of the chlorination because of partial solidification of the 2,4,5-isomer the reaction temperature was raised to 40°–50°C. to permit the necessary stirring.

Vapor phase chromatographic analysis indicated that the reaction mixtures contained about 75 to 90 percent of trichlorotoluenes and small amounts of dichlorotoluenes and tetrachlorotoluenes. The mixtures were distilled to separate a trichlorotoluene fraction, which was then fractionally distilled to yield substantially pure 2,4,5-trichlorotoluene.

The chlorination catalyst systems used and analysis of the products are set forth in Table I.

TABLE I

| Example No. | 1A | 1B | 1C | Comp. ex.A |
|---|---|---|---|---|
| Catalyst System | 2g. ferrous sulfide | 2g. iron powder and 1g. sulfur monochloride | 2g. iron powder and 1g. sulfur | 2g. iron powder |
| Increase in weight during chlorination (g.) | 138.8 | 137.7 | 136.0 | 138.5 |
| Analysis of Product (%) | | | | |
| 2,5-dichlorotoluene* | 0.2 | 0.1 | 0.2 | 0.2 |
| 2,4-dichlorotoluene | 4.5 | 4.3 | 5.7 | 9.4 |
| 2,4,6-trichlorotoluene | 2.0 | 1.5 | 1.9 | 9.7 |
| 2,3,6-trichlorotoluene* | 0.4 | 0.3 | 0.4 | 0.5 |
| 2,3,5-trichlorotoluene* | 0.2 | 0.6 | 0.5 | — |
| 2,4,5-trichlorotoluene | 82.6 | 67.4 | 67.4 | 44.2 |
| 2,3,4-trichlorotoluene | 3.7 | 18.7 | 18.8 | 21.3 |
| 2,3,4,6-tetrachlorotoluene | 2.6 | 4.1 | 2.7 | 10.6 |
| 2,3,4,5-tetrachlorotoluene | 3.8 | 3.0 | 2.4 | 4.1 |
| % 2,4,5-isomer in trichlorotoluene fraction | 93.1 | 76.1 | 75.6 | 58.4 |

Derived from o- and m-chlorotoluenes present in p-chlorotoluene starting material.

EXAMPLE 2

Mixtures of 253 grams (2.0 moles) of commercial parachlorotoluene and chlorination catalysts were chlorinated by the procedure described in Example 1 until a weight increase of about 142 grams was attained.

Vapor phase chromatographic analysis indicated that the reaction mixtures contained about 75 percent of trichlorotoluene and smaller amounts of dichlorotoluene and tetrachlorotoluene. 2,4,5-Trichlorotoluene was separated from the reaction mixture by the procedure described in Example 1.

The catalyst systems used and analyses of the products are set forth in Table II.

TABLE II

| Example No. | 2 | Comp. Ex. B |
|---|---|---|
| Catalyst System | 4 g. zirconium tetrachloride and 1 g. sulfur | 4 g. zirconium tetrachloride |
| Increase in weight during chlorination (g.) | 144.0 | 142.2 |
| Analysis of Product (%) | | |
| 2,4-dichlorotoluene | 3.7 | 6.1 |
| 2,4,6-trichlorotoluene | 0.5 | 5.7 |
| 2,3,6-trichlorotoluene* | 0.5 | 1.1 |
| 2,3,5-trichlorotoluene* | 1.2 | — |
| 2,4,5-trichlorotoluene | 61.6 | 47.9 |
| 2,3,4-trichlorotoluene | 14.1 | 20.4 |
| 2,3,4,6-tetrachlorotoluene | 9.7 | 13.1 |
| 2,3,4,5-tetrachlorotoluene | 8.7 | 5.7 |
| % 2,4,5-isomer in trichlorotoluene fraction | 79.2 | 63.7 |

Derived from o- and m-chlorotoluenes present in p-chlorotoluene starting material.

From the data in Tables I and II it will be seen that the chlorinated products prepared using the catalyst systems of this invention (Examples 1A, B, 1C, and 2) contained substantially larger amounts of the desired 2,4,5-trichlorotoluene than did those prepared using a ring-chlorination catalyst, that is, iron powder (Comp. Ex. A) or zirconium tetrachloride (Comp. Ex. B), as the sole catalyst. A product having a particularly high 2,4,5-trichlorotoluene content was obtained when para-chlorotoluene was chlorinated in the presence of ferrous sulfide.

The terms and expressions which have been employed are used as terms of description and not of limitation. There is no intention in the use of such terms and expressions of excluding any equivalents of the features shown and described or portions thereof, but it is recognized that various modifications are possible within the scope of the invention claimed.

I claim:

1. The process for the production of trichlorotoluene containing at least 75 percent of 2,4,5-trichlorotoluene which comprises contacting para-chlorotoluene with gaseous chlorine in the presence of
    b. Ferrous sulfide in the amount of 1 gram to 3 grams per mole of para-chlorotoluene at a temperature in the range of −5° to 100°C. to form a mixture of chlorotoluenes containing an average of about 3 gram atoms of chlorine per mole and thereafter separating from said mixture a trichlorotoluene fraction containing at least 75 percent of 2,4,5-trichlorotoluene.

2. The process for the production of 2,4,5-trichlorotoluene that comprises the steps of contacting para-chlorotoluene with chlorine in the presence of a catalytic amount of ferrous sulfide at a temperature in the range of 25° to 50°C. to form a mixture of chlorotoluenes containing an average of about 3 gram atoms of chlorine per mole, separating from said mixture a trichlorotoluene fraction containing at least 90 percent of 2,4,5-trichlorotoluene, and separating from said trichlorotoluene fraction substantially pure 2,4,5-trichlorotoluene.

* * * * *

UNITED STATES PATENT OFFICE
CERTIFICATE OF CORRECTION

Patent No. 3,692,850        Dated Sept. 19, 1972

Inventor(s) Eugene P. Di Bella

It is certified that error appears in the above-identified patent and that said Letters Patent are hereby corrected as shown below:

Column 3, line 60, insert an asterisk (*) before "Derived".

Column 4, line 29, insert an asterisk (*) before "Derived".

Column 4, line 55, change "b. Ferrous" to -- ferrous --.

Signed and sealed this 13th day of February 1973.

(SEAL)
Attest:

EDWARD M. FLETCHER, JR.
Attesting Officer

ROBERT GOTTSCHALK
Commissioner of Patents